(12) United States Patent
Yu et al.

(10) Patent No.: US 8,185,389 B2
(45) Date of Patent: May 22, 2012

(54) NOISE SUPPRESSOR FOR ROBUST SPEECH RECOGNITION

(75) Inventors: Dong Yu, Kirkland, WA (US); Li Deng, Redmond, WA (US); Yifan Gong, Sammamish, WA (US); Jian Wu, Redmond, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 769 days.

(21) Appl. No.: 12/335,558

(22) Filed: Dec. 16, 2008

(65) Prior Publication Data

US 2010/0153104 A1 Jun. 17, 2010

(51) Int. Cl.
*G10L 15/20* (2006.01)

(52) U.S. Cl. .................................................. 704/233

(58) Field of Classification Search .................. 704/233
See application file for complete search history.

(56) References Cited

U.S. PATENT DOCUMENTS

| | | | |
|---|---|---|---|
| 6,718,302 B1 * | 4/2004 | Wu et al. ........................ | 704/233 |
| 6,826,528 B1 * | 11/2004 | Wu et al. ........................ | 704/226 |
| 7,047,047 B2 | 5/2006 | Acero et al. | |
| 7,376,558 B2 | 5/2008 | Gemello et al. | |
| 2004/0148160 A1 | 7/2004 | Ramabadran | |
| 2005/0010406 A1 | 1/2005 | Koshiba et al. | |
| 2006/0053008 A1 | 3/2006 | Droppo et al. | |
| 2008/0059163 A1 | 3/2008 | Ding et al. | |
| 2008/0114593 A1 | 5/2008 | Tashev et al. | |

OTHER PUBLICATIONS

Yu, et al., "Robust Speech Recognition Using a Cepstral Minimum-Mean-Square-Error-Motivated Noise Suppressor", Retrieved at <<http://ieeexplore.ieee.org/iel5/10376/4544815/04497834.pdf?isnumber=4544815&prod=JNL&arnumber=4497834&arSt=1061&ared=1070&arAuthor=Yu%2C+D.%3B+Deng%2C+L.%3B+Droppo%2C+J.%3B+Wu%2C+J.%3B+Gong%2C+Y.%3B+Acero&2C+A.+A.>>, IEEE Transactions on Audio, Speech, and Language Processing, vol. 16, No. 5, Jul. 2008, pp. 1061-1070.

Claes, et al., "Spectral Estimation and Normalisation for Robust Speech Recognition", Retrieved at <<http://www.asel.udel.edu/icslp/cdrom/vol4/152/a152.pdf >>, pp. 4.

Li, et al., "Inter-Frequency Dependency in MMSE Speech Enhancement", Retrieved at <<http://citeseerx.ist.psu.edu/viewdoc/download;jsessionid=5957B4852B6F1FBB76E896D2431F0452?doi=10.1.1.6.2260&rep=rep1&type=pdf>>, Proceedings of the 6th Nordic SignalProcessing Symposium—NORSIG, Jun. 9-11, 2004, pp. 200-203.

(Continued)

*Primary Examiner* — Susan McFadden

(74) *Attorney, Agent, or Firm* — Gonzalez Saggio & Harlan LLP

(57) ABSTRACT

Described is noise reduction technology generally for speech input in which a noise-suppression related gain value for the frame is determined based upon a noise level associated with that frame in addition to the signal to noise ratios (SNRs). In one implementation, a noise reduction mechanism is based upon minimum mean square error, Mel-frequency cepstra noise reduction technology. A high gain value (e.g., one) is set to accomplish little or no noise suppression when the noise level is below a threshold low level, and a low gain value set or computed to accomplish large noise suppression above a threshold high noise level. A noise-power dependent function, e.g., a log-linear interpolation, is used to compute the gain between the thresholds. Smoothing may be performed by modifying the gain value based upon a prior frame's gain value. Also described is learning parameters used in noise reduction via a step-adaptive discriminative learning algorithm.

20 Claims, 4 Drawing Sheets

OTHER PUBLICATIONS

Li, et al., "A Block-Based Linear MMSE Noise Reduction with a High Temporal Resolution Modeling of the Speech Excitation", Retrieved at <<http://delivery.acm.org/10.1145/1290000/1287337/p2965-li.pdf?key1=1287337&key2=0942569121&coll=GUIDE&dl=GUIDE&CFID=26194802&CFTOKEN=93385763>>,EURASIP Journal on Applied Signal Processing, 2005:18, Mar. 11, 2005, pp. 2965-2978.

Chen, et al., "Subtraction of Additive Noise from Corrupted Speech for Robust Speech Recognition", Retrieved at <<http://maxwell.me.gu.edu.au/spl/publications/papers/asj01_chen.pdf >>, pp. 2.

Yu, et al., "A Minimum-Mean-Square-Error Noise Reduction Algorithm on Mel-Frequency Cepstra for Robust Speech Recognition", Retrieved at <<http://research.microsoft.com/~dongyu/papers/c-mmse-icassp2008.pdf>>, IEEE, 2008, pp. 4041-4044.

Cohen, et al., "Noise Estimation by Minima Controlled Recursive Averaging for Robust Speech Enhancement", Retrieved at <<http://ieeexplore.ieee.org/iel5/97/21290/00988717.pdf?arnumber=988717>>, IEEE Signal Processing Letters, vol. 9, No. 1, Jan. 2002, pp. 12-15.

Ephraim, et al., "Speech Enhancement Using a Minimum Mean-Square Error Short-Time Spectral Amplitude Estimator", Retrieved at <<http://ieeexplore.ieee.org/iel6/29/26187/01164453.pdf?tp=&isnumber=&arnumber=1164453>>, IEEE Transactions on Acoustics, Speech, and Signal Processing, vol. ASSP-32, No. 6, Dec. 1984, pp. 1109-1121.

Ephraim, et al., "Speech Enhancement Using a Minimum Mean-Square Error Log-Spectral Amplitude Estimator", Retrieved at <<http://ieeexplore.ieee.org/iel6/29/26190/01164550.pdf?tp=&isnumber=&arnumber=1164550>>, IEEE Transactions on Acoustics, Speech, and Signal Processing, vol. ASSP-33, No. 2, Apr. 1985, pp. 443-445.

Pearce, et al., "The Aurora Experimental Framework for the Performance Evaluation of Speech Recognition Systems under Noisy Conditions", Retrieved at <<http://dnt.kr.hs-niederrhein.de/papers/icslp2000_final_footer.pdf>>, ICSLP 2000 (6th International Conference on Spoken Language Processing); Beijing, China, Oct. 16-20, 2000, pp. 4.

Riedmiller, et al., "RPROP—A Fast Adaptive Learning Algorithm", Retrieved at <<http://citeseer.comp.nus.edu.sg/cache/papers/cs/2016/ftp:zSzzSzftp.ira.uka.dezSzpubzSzneuronzSzpaperszSzrprop_iscis.pdf/rprop-a-fast-adaptive.pdf>>, pp. 7.

* cited by examiner

NOISE SUPPRESSOR FOR ROBUST SPEECH RECOGNITION

BACKGROUND

A non-linear feature-domain noise reduction algorithm based on the minimum mean square error (MMSE) criterion on Mel-frequency cepstra (MFCC) has been developed for environment-robust speech recognition, as generally described in U.S. Patent Application Publication No. US2005/0182624 (herein incorporated by reference). While this technology works reasonably well in many situations, like other such speech enhancement algorithms, automatic speech recognition accuracy is improved for noisy speech, but is more degraded with clean speech.

Other problems include that the original speech enhancement algorithm sometimes leads to abrupt change of the gain, and that the parameters in the prior speech enhancement algorithm are manually selected and thus sub-optimal. Any improvements to these problems are desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a noise reduction mechanism (e.g., a minimum mean square error, Mel-frequency cepstra noise reduction mechanism incorporated into a feature extraction pipeline) processes input frames corresponding to audible data. The noise reduction mechanism includes gain computation logic that determines a noise-suppression related gain value for the frame based upon a noise level associated with that frame. For example, the logic sets a high gain value (e.g., one) to accomplish little or no noise suppression when the noise level is below a threshold low level, and sets or computes a low gain value when the noise level is above a threshold high level to accomplish relatively large noise suppression. When the noise level is between the threshold high level and the threshold low level, the gain value is computed based upon a noise-power dependent function, e.g., a log-linear interpolation.

In one aspect, smoothing may be performed by modifying the gain value determined for a given frame based upon the gain value of at least one prior frame. Also described is learning parameters for the noise reduction pipeline, such as the threshold low level and/or the threshold high level, via a step-adaptive discriminative learning algorithm.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a modified gain function that operates such that noise suppression is aggressive when the noise level is high, and conservative when the noise level is low. Further, to avoid abrupt changes in gain, the gain may be smoothed based upon the gain used in one or more previous frames. Still further, parameter training is improved by considering training as a multi-objective problem, with an efficient and effective step-adaptive discriminative learning algorithm (SADLA) provided to adjust the parameters used by the noise tracker and the suppressor.

It should be understood that any of the examples described herein are non-limiting examples. Indeed, the technology can be applied to any signal/feature (speech or otherwise) enhancement in an approximate manner. For example, the gain-adjustment function described herein may be applied to other gain functions such as Ephraim and Malah's MMSE and logMMSE suppressor, and the described parameter tuning algorithm may also be applied to such noise suppressors when these suppressors are used for speech recognition purposes. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and hosting applications in general.

Figure 1:
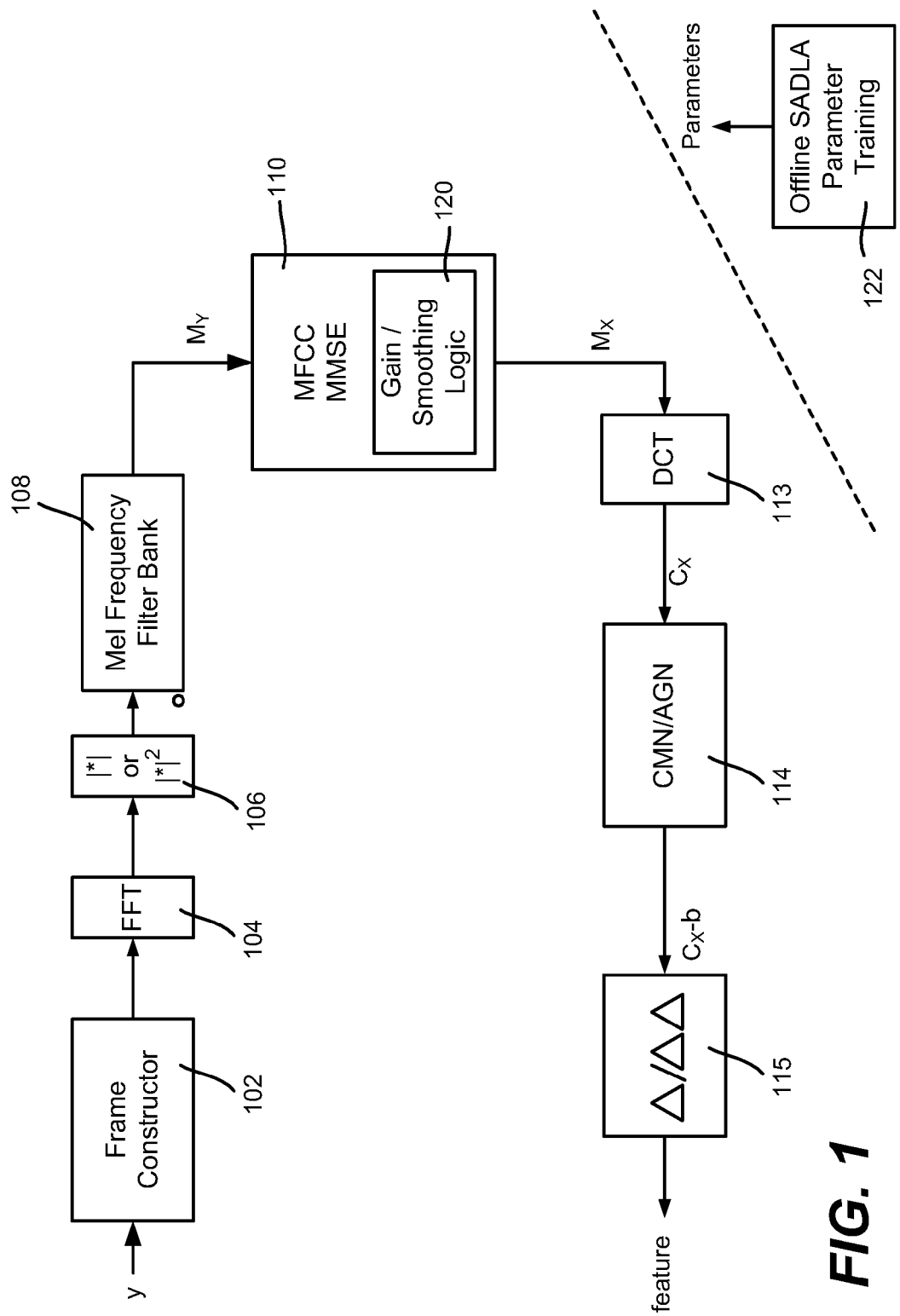
FIG. 1 is a block diagram showing a feature extraction pipeline for an MFCC-MMSE system.

FIG. 1 shows components of a feature extraction pipeline for a non-linear feature-domain noise reduction mechanism based on the minimum mean square error (MMSE) criterion on Mel-frequency cepstra (MFCC) for environment-robust speech recognition. In FIG. 1, y represents the noisy speech, which is converted into a sequence of digital values that are grouped into frames in a known manner by a frame constructor 102 and passed through a fast Fourier transform (FFT) 104. The FFT 104 computes the phase and magnitude of a set of frequencies found in the frame. The magnitude or the square of the magnitude of each FFT is then processed by block 106.

In one implementation, the magnitude values are applied to a Mel-frequency filter bank 108, which applies perceptual weighting to the frequency distribution and reduces the number frequency bins that are associated with the frame; other frequency-based transforms may be used. A log function may be applied to the values to compute the logarithm of each frequency magnitude, and the logarithms of each frequency may be applied to a discrete cosine transform. When a Mel-frequency filter bank 108 is used, the observation vector is referred to as a Mel-Frequency Cepstral Coefficient (MFCC) vector.

In this technology, a non-linear feature-domain noise reduction algorithm is based on the minimum mean square error (MMSE) criterion on Mel-frequency cepstra (MFCCS) for environment-robust speech recognition, as represented by block 110. Note that the other components 113-115 in FIG. 1 are shown for completeness in outputting features, e.g., including the DCT (discrete cosine transform) and CMN/AGN (Cepstral mean normalization/automatic gain normalization).

In general, seeking an MMSE estimator on MFCCs can be reduced to seeking a log-MMSE estimator on the Mel-frequency filter bank's (MFFB's) outputs, which in turn can be solved independently for each filter bank channel. An MFCC-MMSE noise suppressor is built by assigning uniformly distributed random phases to the real-valued filter bank's outputs with the assumption that the artificially generated complex filter bank's outputs follow zero-mean complex normal distributions.

The MFCC-MMSE noise suppressor estimates the clean speech MFCC $\hat{c}_x(k)$ from the noisy speech y for each cepstrum dimension k by minimizing the mean square error between the estimated MFCC $\hat{c}_x(k)$ and the true MFCC $c_x(k)$ with the assumption that noises are additive. A solution to this problem is:

$$\hat{c}_x(k) = E\{c_x(k) | m_y\}$$
$$= E\left\{\sum_b a_{k,b} \log m_x(b) \middle| m_y\right\}$$
$$= \sum_b a_{k,b} E\{\log m_x(b) | m_y\}$$
$$\cong \sum_b a_{k,b} E\{\log m_x(b) | m_y(b)\}.$$
$$= \sum_b a_{k,b} \log(G(\xi(b), v(b)) m_y(b)),$$

where $a_{k,b}$ are the discrete cosine transform (DFT) coefficients, $$m_x(b) = \sum_f w_b(f) |X(f)|^2, \text{ and}$$
$$m_y(b) = \sum_f w_b(f) |Y(f)|^2$$

are the Mel-frequency filter bank's output in power for the clean and noisy speech respectively, b is the filter bank channel id, and $$G(\xi(b), v(b)) = \frac{\xi(b)}{1+\xi(b)} \exp\left\{\frac{1}{2} \int_{v(b)}^\infty \frac{e^{-t}}{t} dt\right\}$$

is the gain function for each filter-bank output. The quantity $$v(b) = \frac{\xi(b)}{1+\xi(b)} \gamma(b)$$

is defined by the adjusted a-priori SNR (signal to noise ratio)

$$\xi(b) \stackrel{def}{=} \frac{\sigma_x^2(b)}{\sigma_d^2(b)} \cong \frac{\sigma_x^2(b)}{\sigma_n^2(b) + \sigma_\varphi^2(b)},$$

and the adjusted a-posteriori SNR $$\gamma(b) \stackrel{def}{=} \frac{m_y^2(b)}{\sigma_d^2(b)} \cong \frac{m_y^2(b)}{\sigma_n^2(b) + \sigma_\varphi^2(b)}.$$

for each filter bank channel b.

The noise variance $\sigma_n^2(b) = E\{m_n^2(b)\}$ is estimated using a minimum controlled recursive moving-average noise tracker, $\sigma_\varphi^2(b)$ is estimated using a known decision-directed approach, and the variance $\sigma_\varphi^2(b)$ resulting from instantaneous phase differences between the clean speech and the mixing noise is estimated as:

$$\sigma_\varphi^2(b) = E\left\{\left(\sum_f 2|X(f)||N(f)|\cos\varphi(f)w_b(f)\right)^2\right\}$$
$$= 2\sum_f w_b^2(f) E\{|X(f)|\}^2 E\{|N(f)|\}^2$$

In the original MFCC-MMSE algorithm, the gain G is a function of the a-priori SNR $\xi(b)$ and a-posteriori SNR $\gamma(b)$. These have been improved by the technology described herein.

More particularly, as represented in FIG. 1 by the block 120, a noise-level dependent gain function is used, to avoid the problem that most speech enhancement algorithms improve automatic speech recognition accuracy for noisy speech at the cost of the degraded performance for clean speech. For example, when the SNR is very high, the gain $G(\xi(b), v(b))$ is close to one (no suppression) in theory, however, in practice it is very difficult to accurately estimate the noise and the SNR. Distortions are thus inevitably introduced in the enhanced speech, which can outweigh the noise reduction for the clean speech.

Figure 2:
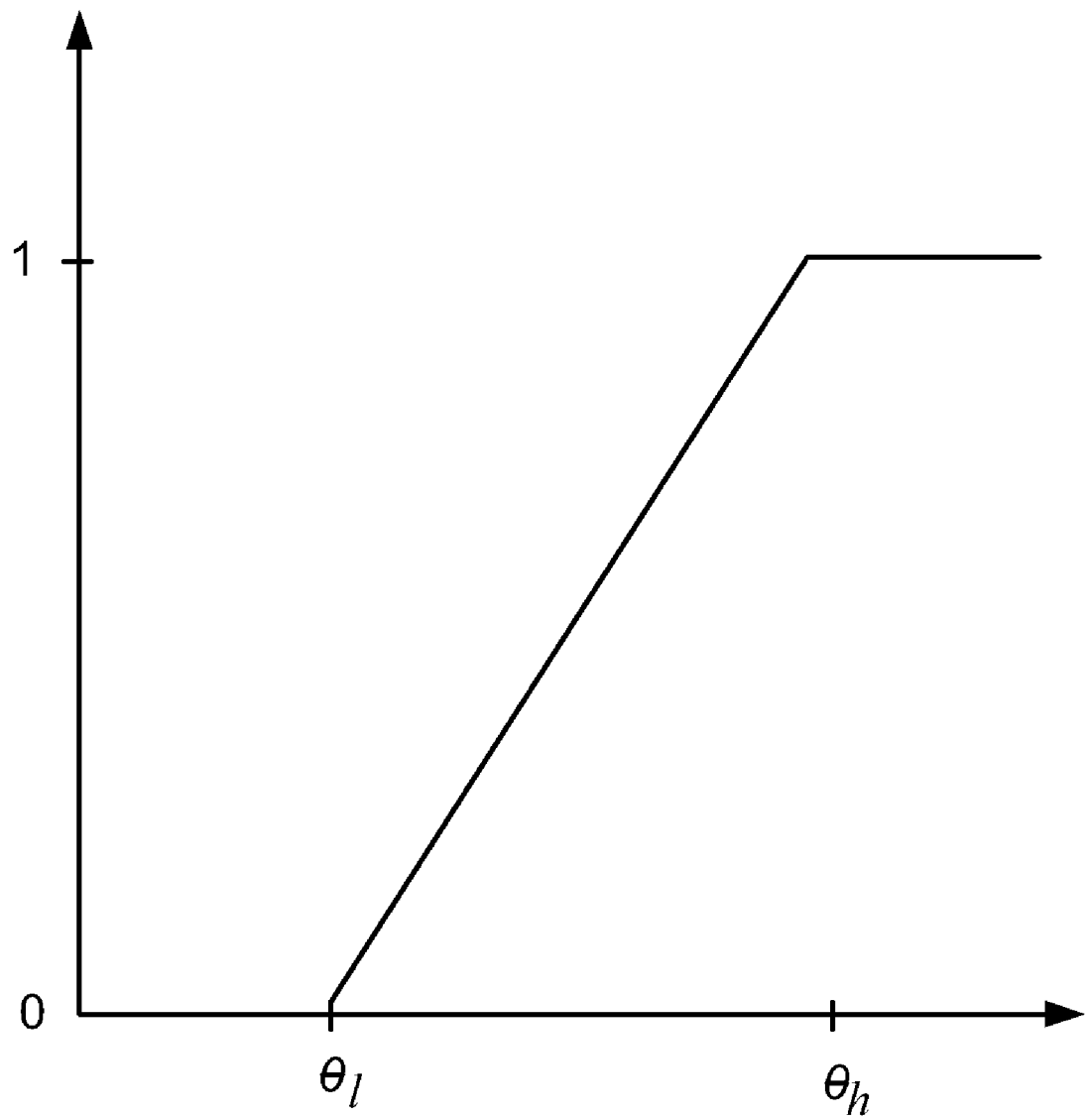
FIG. 2 is a graphical representation of an example gain-adjustment function that may be used in the MFCC-MMSE system of FIG. 1.

To prevent the degradation of recognition accuracy for the clean speech, the prior gain function is revised as:

$$G(\xi(b), v(b), \sigma_n^2(b)) = \begin{cases} 1 & \text{if } \sigma_n^2(b) < \theta_l \\ G(\xi(b), v(b))^{\frac{(\sigma_n^2(b)-\theta_l)}{(\theta_h-\theta_l)}} & \text{if } \theta_l \le \sigma_n^2(b) \le \theta_h \\ G(\xi(b), v(b)) & \text{if } \sigma_n^2(b) > \theta_h \end{cases}$$

where $\theta_l$ and $\theta_h$ are thresholds, whereby the gain depends not only on instantaneous SNRs, but also on the noise power. The revised gain function, represented graphically in FIG. 2, Error! Reference source not found.indicates that no suppression is applied if the noise power is below the threshold $\theta_l$, while the full suppression is applied if the noise power is above the threshold $\theta_h$. If the noise power is within the threshold values [$\theta_l, \theta_h$], the gain is reduced based on the noise power level. Note that the gain function is dependent on the noise power instead of the SNR due to the fact that the noise power is usually more stable than the instantaneous SNR, and can be estimated without introducing latency as compared to an utterance SNR. Further note that while the above function and FIG. 2 show linear interpolation between the thresholds, any monotonically increasing function may be used.

Further, in the prior MFCC-MMSE noise suppressor, the gain G depends only on the a-priori SNR $\xi(b)$ and a-posteriori SNR $\gamma(b)$ of the current frame. However, the instantaneous SNR sometimes changes drastically, which in turn causes abrupt change of the gain. To prevent this from happening, the gain of the current frame may be smoothed with the gain with the previous frame, that is:

$$G(\xi(b),v(b),\sigma_n^2(b))_t = \alpha G(\xi(b),\xi(b),\sigma_n^2(b))_t + (1-\alpha)G(\xi(b),v(b),\sigma_n^2(b))_{t-1}$$

where α is a smooth factor. Note that more than one previous frame may be considered in the computation.

Figure 3:
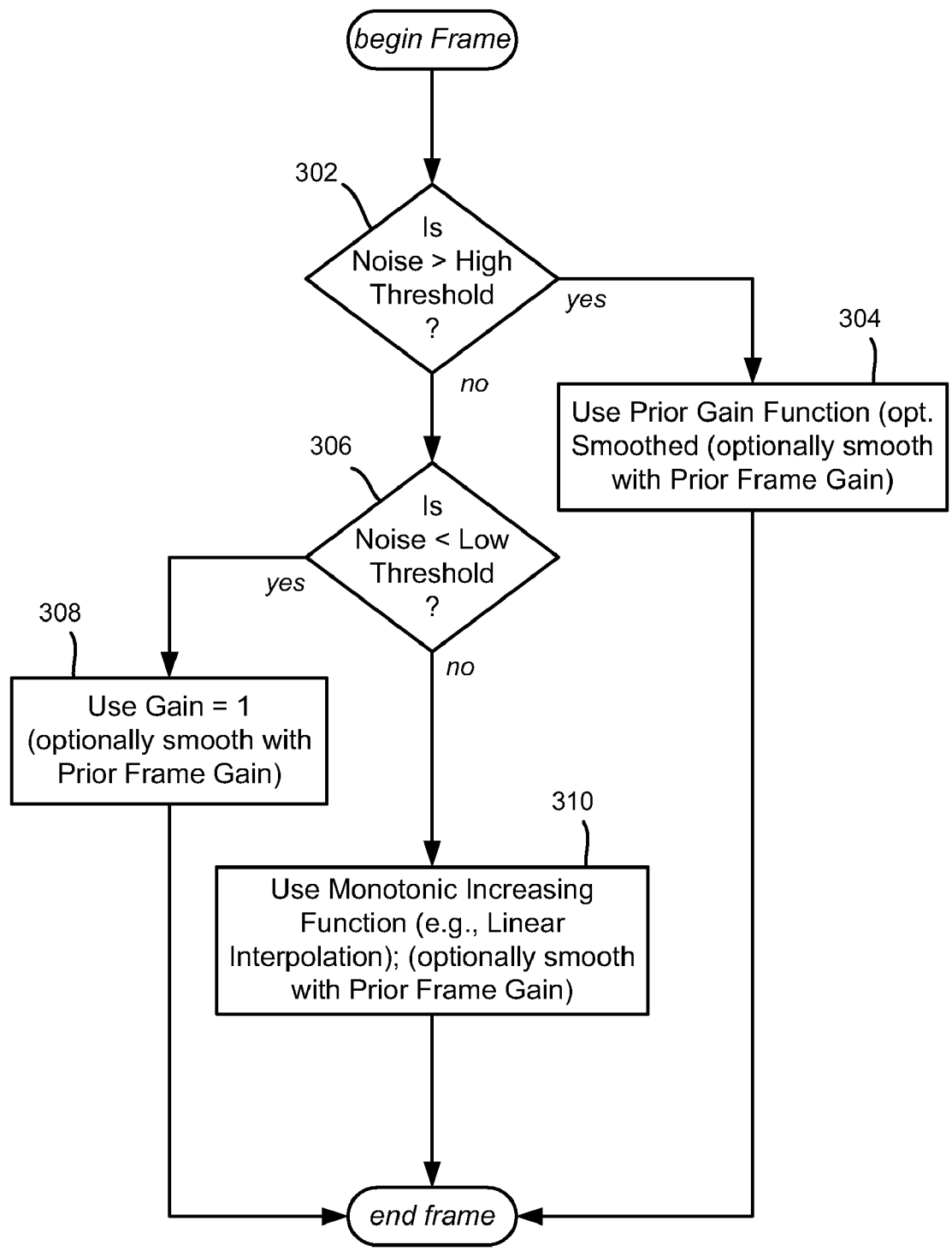
FIG. 3 is a flow diagram showing example steps for determining the gain based on noise input, and optionally smoothing the determined gain based on a prior frame's gain value.

FIG. 3 summarizes the operations in logical form, beginning at step 302 where the noise level is compared with the high threshold. If the noise level achieves the high threshold (if $\sigma_n^2(b) > \theta_h$), the prior gain function ($G(\xi(b),v(b))$) is used via step 304.

If the noise level is not high, in this logic the noise level is compared against the low threshold at step 306. If the noise level is below the low threshold (f$\sigma_n^2(b) < \theta_l$), a gain of one is used via step 308. Otherwise the gain is between the thresholds, whereby a monotonic increasing function (e.g., log-linear interpolation $$\left(G(\xi(b), v(b))^{\frac{(\sigma_n^2(b)-\theta_l)}{(\theta_h-\theta_l)}}\right)$$

is used to compute the gain at step 308.

As also shown in FIG. 3, wherever the function 1 gain is determined, the gain can be optionally smoothed based upon the gain of a prior frame (or the gains of a set of prior frames).

Turning to another aspect, the various parameters used in noise tracking and speech enhancement algorithms are typically determined by trial-and-error, or by an expert who knows the approximate range of the best values. As used herein, the parameters are set based on considering the parameter tuning problem as a multi-objective minimum word error rate optimization problem, which provides an efficient and effective way to train the parameters.

To optimize the parameters, a reference and a judgment function are used. In the human-to-human communication scenario, the reference for the speech enhancement algorithms is usually the clean speech, and the judgment function is usually the 5-level mean opinion score (MOS) provided by the human listeners or its approximation perceptual evaluation of speech quality (PESQ) score. To improve the ASR recognition accuracy by making the noisy speech closer to the clean speech, a clean-trained ASR model is used as the reference, and the word error rate as the judgment function.

There are two objectives in the optimization process including optimizing the parameters to minimize the average WER $\epsilon_a$, i.e., $$\hat{p}_a = \operatorname*{argmin}_\rho \epsilon_a.$$

And optimizing the parameters to minimize the WER $\epsilon_c$ on the clean speech, i.e., $$\hat{p}_c = \operatorname*{argmin}_\rho \epsilon_c.$$

Note that these objectives may conflict with each other. For example, a more aggressive suppression reduces the average WER but may increase the WER on the clean speech. This two-objective optimization problem is reduced to a single-objective optimization problem by choosing an operating point β∈[0 1] such that:

$$\hat{p} = \operatorname*{argmin}_\rho \epsilon = \operatorname*{argmin}_\rho \beta \epsilon_c + (1-\beta)\epsilon_a.$$

For example, to have no degradation or little degradation on the clean speech, β=0.9 may be chosen, which means one percent of the WER on the clean speech is sacrificed only if the reduction on the average WER is nine percent or more. Different operating points can be used based on the specific usage condition.

The optimization of the objective function has two intrinsic difficulties. First, many parameters used in the noise suppressor are thresholds and smoothing factors. It is very difficult (if not impossible) to get a closed form formula of the derivatives of the WER against the parameters. In other words, the algorithm cannot depend on the closed-form derivatives. Second, there are many local minimums and plateaus in the search space since there are many parameters to learn and the relationship between the parameters are very complicated. The algorithm needs to have some ability to jump out of the local minimums.

With these requirements and constraints in mind, there is provided an efficient and effective optimization algorithm, referred to as the step-adaptive discriminative learning algorithm (SADLA), as represented in FIG. 1 via block 122. In general, the algorithm 122 optimizes the parameters, one by one using approaches (somewhat similar to a known RPROP algorithm but with significant differences). First, the algorithm 122 does not require derivative information and can walk through the plateaus quickly. Second, the algorithm 122 randomly chooses the equally good values and has better chance to walk downward instead of being locked at a local minimum. Third, the algorithm 122 splits the training set into several parts and tunes the parameters with one additional part included, iteration by iteration, until the whole training set is used. By doing this, the algorithm has better chance to walk out of the local minimum.

The following code tables summarize the algorithm steps. Note that although the algorithm works well practically, it does not guarantee a global optimal solution, but rather is a compromise between efficiency and the possibility of finding the optimal solution. Also note that the example algorithm is sufficiently generic for use in solving other optimization problems.

The following example code shows a top-level function of the SADLA parameter tuning algorithm 122:

```
Run n iterations {
    Add a new part from the training set;
    For each parameter {
        Tune the parameter to minimize ε;
    }
}
```

The following example code provides a function to learn one parameter p in the SADLA parameter tuning algorithm:

Initialize current value v, step size s, current WER ε, and current best WER $\hat{\epsilon}$;

-continued

```
Initialize last decision d_{t-1} to be correct;
Set current best values v̂ ← {v};
Run m iterations or till |s|< minimum step s_p {
    v ← v + s;
    Get the new WER ε_m on the training set;
        if (ε̂ > ε_m) { ε̂ ← ε_m; v̂ ← {v}; }
        else if (|ε - ε_m| ≦ θ) { v̂ ← v̂ ∪ {v}; }
        if (ε_m < ε) {
            if (d_{t-1} = true) s ← s × 1.2;
            else s ← s × 0.5;
            d_{t-1} ← true;
        }
        else { s ← -s × 0.5; d_{t-1} ← false; }
        ε ← ε_n;
}
Return a randomly selected value from v̂.
```

Exemplary Operating Environment

Figure 4:
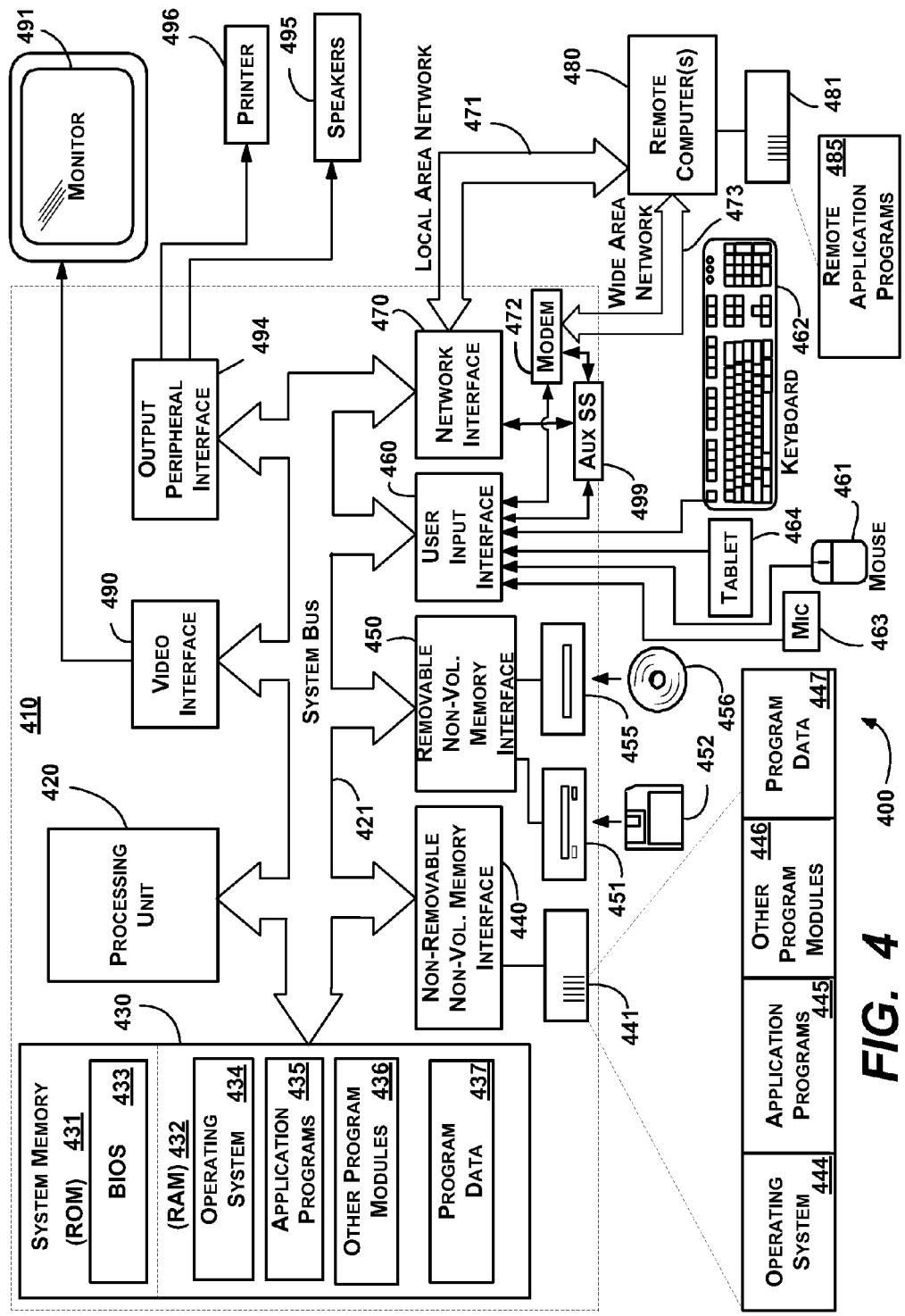
FIG. 4 shows an illustrative example of a computing environment into which various aspects of the present invention may be incorporated.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method comprising, employing at least one processor to perform steps comprising, receiving first data corresponding to a frame of audible input, receiving second data corresponding to a noise level, and determining a gain value for use in noise reduction based upon the noise level, including determining a high gain value to accomplish little or no noise suppression when the noise level is below a threshold low noise level.

2. The method of claim 1 wherein determining the high gain value comprises setting the gain value to one.

3. The method of claim 1 further comprising, modifying the gain value based upon the gain value of at least one prior frame.

4. The method of claim 1 further comprising, determining the threshold low noise level via a step-adaptive discriminative learning algorithm.

5. The method of claim 1 wherein determining the gain value comprises setting a low gain value or applying a function to accomplish large noise suppression when the noise level is above a threshold high noise level.

6. The method of claim 5 further comprising, determining the threshold high noise level via a step-adaptive discriminative learning algorithm.

7. The method of claim 5 further comprising, modifying the gain value based upon the gain value of at least one prior frame.

8. The method of claim 1 wherein determining the gain value comprises applying a monotonically increasing noise-power dependent gain-adjustment function based when the noise level is between a threshold high noise level and the threshold low noise level.

9. The method of claim 8 further comprising, modifying the gain value based upon the gain value of at least one prior frame.

10. In a computing environment, a system comprising, at least one processor, a memory communicatively coupled to the at least one processor and including instructions comprising, a noise reduction mechanism that processes input frames corresponding to audible data, the noise reduction mechanism coupled to gain computation logic, the gain computation logic determining a noise-suppression related gain value for the frame based upon a noise level associated with that frame, including setting a high gain value when the noise level is below a threshold low level, setting a low gain value or applying a function to compute the low gain level when the noise level is above a threshold high level, or computing the gain value based upon a noise-power dependent function when the noise level is between the threshold high level and the threshold low level.

11. The system of claim 10 wherein the noise reduction mechanism comprises a minimum mean square error, Mel-frequency cepstra noise reduction mechanism.

12. The system of claim 10 wherein the noise reduction mechanism comprises a minimum mean square error, Mel-frequency cepstra noise reduction mechanism is incorporated into a feature extraction pipeline.

13. The system of claim 10 wherein the noise-power dependent function comprises a linear interpolation between the high gain value and the low gain value based upon the noise level.

14. The system of claim 10 further comprising a smoothing mechanism that modifies the gain value for the frame based upon the gain value of at least one prior frame.

15. The system of claim 10 further comprising means for learning at least one parameter used for noise reduction via a step-adaptive discriminative learning algorithm.

16. The system of claim 10 further comprising means for learning the threshold high level or the threshold low level, or both the threshold high level and the threshold low level via a step-adaptive discriminative learning algorithm.

17. One or more computer storage devices having computer-executable instructions stored thereon, which in response to execution by a computer, cause the computer to perform steps comprising, processing input frames corresponding to audible data, and for each frame, determining a noise-suppression related gain value for the frame based upon a noise level associated with that frame, including setting a high gain value when the noise level is below a threshold low level, setting or computing a low gain value when the noise level is above a threshold high level, or computing the gain value based upon a noise-power dependent function when the noise level is between the threshold high level and the threshold low level.

18. The one or more computer storage devices of claim 17 wherein the noise-power dependent function comprises a monotonically decreasing function.

19. The one or more computer storage devices of claim 17 having further computer-executable instructions stored thereon, which in response to execution by the computer, cause the computer perform further steps comprising modifying the gain value determined for a frame based upon the gain value of at least one prior frame.

20. The one or more computer storage devices of claim 17 having further computer-executable instructions stored thereon, which in response to execution by the computer, cause the computer perform further steps comprising learning the threshold low level or the threshold high level, or both the threshold low level and the threshold high level, via a step-adaptive discriminative learning algorithm.

* * * * *